United States Patent
Alex et al.

(10) Patent No.: US 10,049,156 B2
(45) Date of Patent: Aug. 14, 2018

(54) CROSS-DOMAIN ADAPTATION USING BLOOM FILTERS

(71) Applicant: International Business Machines Corporation, Armonk, NY (US)

(72) Inventors: Gokul B. Alex, Kollam (IN); Vijay Kumar Ananthapur Bache, Bangalore (IN); Joyil Joseph, Bangalore (IN); Nagesh K. Mantripragada, Bangalore (IN); Madhusmita P. Patil, Hyderabad (IN); Rengia R. Vasudevan, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/704,103

(22) Filed: May 5, 2015

(65) Prior Publication Data
US 2016/0328382 A1    Nov. 10, 2016

(51) Int. Cl.
*G06F 17/27*    (2006.01)
*G06F 17/30*    (2006.01)

(52) U.S. Cl.
CPC .. *G06F 17/30731* (2013.01); *G06F 17/30705* (2013.01); *Y02B 60/188* (2013.01); *Y02D 10/45* (2018.01)

(58) Field of Classification Search
CPC ............ G06F 17/2785; G06F 17/2775; G06F 17/2705
See application file for complete search history.

(56) References Cited

U.S. PATENT DOCUMENTS

| 7,620,781 B2 | 11/2009 | Breternitz, Jr. et al. |
| 7,930,547 B2 | 4/2011 | Hao et al. |

(Continued)

FOREIGN PATENT DOCUMENTS

CN    103020296 B    2/2016

OTHER PUBLICATIONS

"Bijection", From Wikipedia, the free encylopedia, last modified on Aug. 28, 2014 at 07:00, pp. 1-7, <http.//en.wikipedia.org/wiki/Bijective>.

(Continued)

*Primary Examiner* — Qian Yang
(74) *Attorney, Agent, or Firm* — Gilbert Harmon, Jr.

(57) ABSTRACT

A system for cross-domain adaptation includes an analysis module, a set configuration module, a set multiplexer, a scalable bloom filter, a mapping module, and an aggregation module. The cross-domain adaptation system may allow for bloom filter adaptation across industries and domains with minimal increases in necessary hardware and consequentially minimal increases in power consumption and cost of area. A method for multi-domain adaptation in datasets includes performing multi-domain semantic analysis on a set of data, providing two complementary domain adaptive sets, processing the complementary domain adaptive sets to provide a multi-fractal representation of the dataset, processing the multi-fractal representation of the dataset with a scalable bloom filter to provide two filtered domain adaptive sets, providing a bijective holomorphic map of the filtered domain adaptive sets, and processing the bijective holomorphic map to provide multi-domain insight aggregator output. A computer program product corresponding to the method is also disclosed.

20 Claims, 6 Drawing Sheets

(56) References Cited

U.S. PATENT DOCUMENTS

| | | | |
|---|---|---|---|
| 8,032,529 | B2 | 10/2011 | Gupta et al. |
| 8,209,368 | B2 | 6/2012 | Beyer et al. |
| 8,266,506 | B2 | 9/2012 | Hao et al. |
| 9,361,327 | B1 | 6/2016 | Chen, Jr. et al. |
| 2009/0282012 | A1* | 11/2009 | Konig ............... G06F 17/2785 |
| 2010/0281160 | A1* | 11/2010 | Ros-Giralt ............ H04L 43/18 709/224 |
| 2012/0287934 | A1* | 11/2012 | Sarela .................... H04L 45/04 370/392 |
| 2013/0013291 | A1* | 1/2013 | Bullock ............. G06F 17/2785 704/9 |

OTHER PUBLICATIONS

Crainiceanu, Adina, "Bloofi: A Hierarchical Bloom Filter Index with Applications to Distributed Data Provenance", Cloud-I '13 Proceedings of the 2nd International Workshop on Cloud Intelligence, Aug. 26, 2013, United States Naval Academy (USNA.edu), pp. 1-8.

Demarco, Giuseppe, "Selected topics of Complex Analysis A.A. 2011-2012", The Riemann mapping theorem, noted in Post Disclosure dated Jul. 14, 2014, pp. 1-75, <http://www.math.unipd.it/~pietro/doc/Complex_Analysis/De%20Marco%20-%20Selected%20topics%20of%20Complex%20Analysis2012.pdf>.

Heszberger, et al., "Adaptive Bloom Filters for Multicast Addressing", This paper was presented as part of the High-Speed Networks 2011 (HSN 2011) workshop at IEEE INFOCOM 2011, pp. 174-179, © 2011 IEEE.

Ho, Nicholas, Ph.D., "An introduction to multifractal measurements", Research Scientist, National Security Directorate, Pacific Northwest National Laboratory, DOE Summer School in Multiscle Mathematics and High Performance Computing, noted in Post Disclosure dated Jul. 14, 2014, pp. 1-60.

"Holomorphic function", From Wipipedia, the free encyclopedia, last modified on Nov. 10, 2014 at 20:19, pp. 1-7, <http.//en.wikipedia.org/wiki/Holomorphic_function>.

IBM et al., "IBM LanguageWare Resource Workbench", Jul. 20, 2012, pp. 1-5, <https://www.ibm.com/developerworks/community/groups/service/html/communityview?communityUuid=6adead21-9991-44f6-bdbb-baf0d2e8a673>.

IP.com, "Framework for Stream De-duplication using Biased Reservoir Sampling", Authors et al.: Disclosed Anonymously, IP.com No. 000216344, Mar. 31, 2012, pp. 1-6.

"Lexical Analysis and Semantic Parsing", Copyright © 2001-2014 Syncfusion Inc., pp. 1-3, <http://help.syncfusion.com/ug/windowsforms/default.htm#!documents/lexicalanalysisandse.htm>.

Lopes, et al., "Fractal and multifractal analysis: A review", Medical Image Analysis 13 (2009) 634-649, © 2009 Elsevier B.V., doi:10.1016/j.media2009.05.003, pp. 634-649.

"Python-bloomfilter/pybloom.py at master . jaybaird/python-bloomfilter", Git-Hub, noted in Post Disclosure dated Jul. 14, 2014, pp. 1-7, © 2014 GitHub, Inc., <https//github.com/jaybaird/python-bloomfilter/blob/master/pybloom/pybloom.py>.

"The Julia and Mandelbrot Set", Lode's Computer Graphics Tutorial, Julia and Mandelbrot Sets, noted in Post Disclosure dated Jul. 14, 2014, last edited: 2004, Copyright (c) 2004-2007 by Lode Vandevenne, pp. 1-10, <http://lodev.org/cgtutor/juliaamandelbrot.html>.

\* cited by examiner

In 2015, 665 heart patients in Tamil Nadu were given the medicine 'Aspirin' in large quantities and were found to be allergic to it. However, they travelled to a northern region and reached a remote Ayurvedic hospital with very good tele-density and started taking natural medicines for one year. They used various modes of transport as the region had diverse connecting points to the metropolitan areas. Doctors were not sure if their disease was caused by an allergy to the medicine or the disproportionately high dose. They started remote sessions with doctors in Chennai to explore their case history.

FIG. 3A

| Telecom | Remote Ayurvedic hospital | Aspirin | Metropolitan areas |
|---|---|---|---|
| North | Healthcare | Connecting points to the metropolitan area | Allergy |
| 665 | 2015 | Telemedicine | Natural medicines |
| 2015 | Diverse connecting points | Large quantities | Transport |

FIG. 3B

| Telecom | Good tele-density | Doctors in Chennai | Travelled north region |
|---|---|---|---|
| Remote Ayurvedic | Healthcare | Connecting points to the metropolitan area | Diverse connecting points |
| Connecting points to the metropolitan area | Connecting points to the metropolitan area | Telemedicine | Connecting points |
| Case history | Remote Ayurvedic hospitals | Remote sessions | Transport |

FIG. 3C

| Telecom | Good tele-density |
|---|---|
| Remote Ayurvedic | Healthcare |

| Healthcare | Telemedicine |
|---|---|
| Remote Ayurvedic hospitals | Transport |

| Healthcare | Healthcare |
|---|---|
| Case history | Healthcare |

| Healthcare | Remote sessions with doctors |
|---|---|
| Doctors in Chennai | Telemedicine |

| Telemedicine | Connection points |
|---|---|
| Remote sessions | Transport |

FIG. 3D

CROSS-DOMAIN ADAPTATION USING BLOOM FILTERS

BACKGROUND OF THE INVENTION

The present invention relates generally to the field of data processing, and more particularly to cross-domain adaptation in datasets.

Computation intensive multi-dimensional applications are predominant in several domains such as image and video processing and detection systems (e.g., radar, sonar). Existing multi-dimensional data processing techniques are specific to particular applications and domains.

SUMMARY

As disclosed herein, a method, executed by a computer, for multi-domain adaptation in datasets includes performing multi-domain semantic analysis on a set of data, providing two complementary domain adaptive sets, processing the complementary domain adaptive sets to provide a multi-fractal representation of the dataset, processing the multi-fractal representation of the dataset with a scalable bloom filter to provide two filtered domain adaptive sets, providing a bijective holomorphic map of the filtered domain adaptive sets, and processing the bijective holomorphic map to provide multi-domain insight aggregator output. A computer program product corresponding to the method is also disclosed.

A corresponding system for cross-domain adaptation includes an analysis module, a set configuration module, a set multiplexer, a scalable bloom filter, a mapping module, and an aggregation module. The cross-domain adaptation system may allow for bloom filter adaptation across industries and domains with minimal increases in necessary hardware and consequentially minimal increases in power consumption and cost of area.

BRIEF DESCRIPTION OF THE DRAWINGS

FIG. 3A depicts a textual description of an example business problem in accordance with one embodiment of the present invention;

FIG. 3B depicts an example *Julia* set matrix in accordance with one embodiment of the present invention;

FIG. 3C depicts an example Fatou set matrix in accordance with one embodiment of the present invention FIG. 3D depicts example key-value pair matrices in accordance with one embodiment of the present invention;

DETAILED DESCRIPTION

Current bloom filter implementations are very domain specific. Therefore, for any scenario which requires set membership tests in multiple domains, multiple bloom filters are required. Bloom filters are used to minimize complexity for large scale set membership tests. Implementing a bloom filter requires a number of hash functions, call the number n, which then requires an n-ported hash table, or n sequential hash table accesses. The area of a hardware table increases exponentially with the port count. The method and system disclosed herein enables cross-domain adaptation using bloom filters, which may reduce the hardware requirements of a bloom filter implementation.

Figure 1:
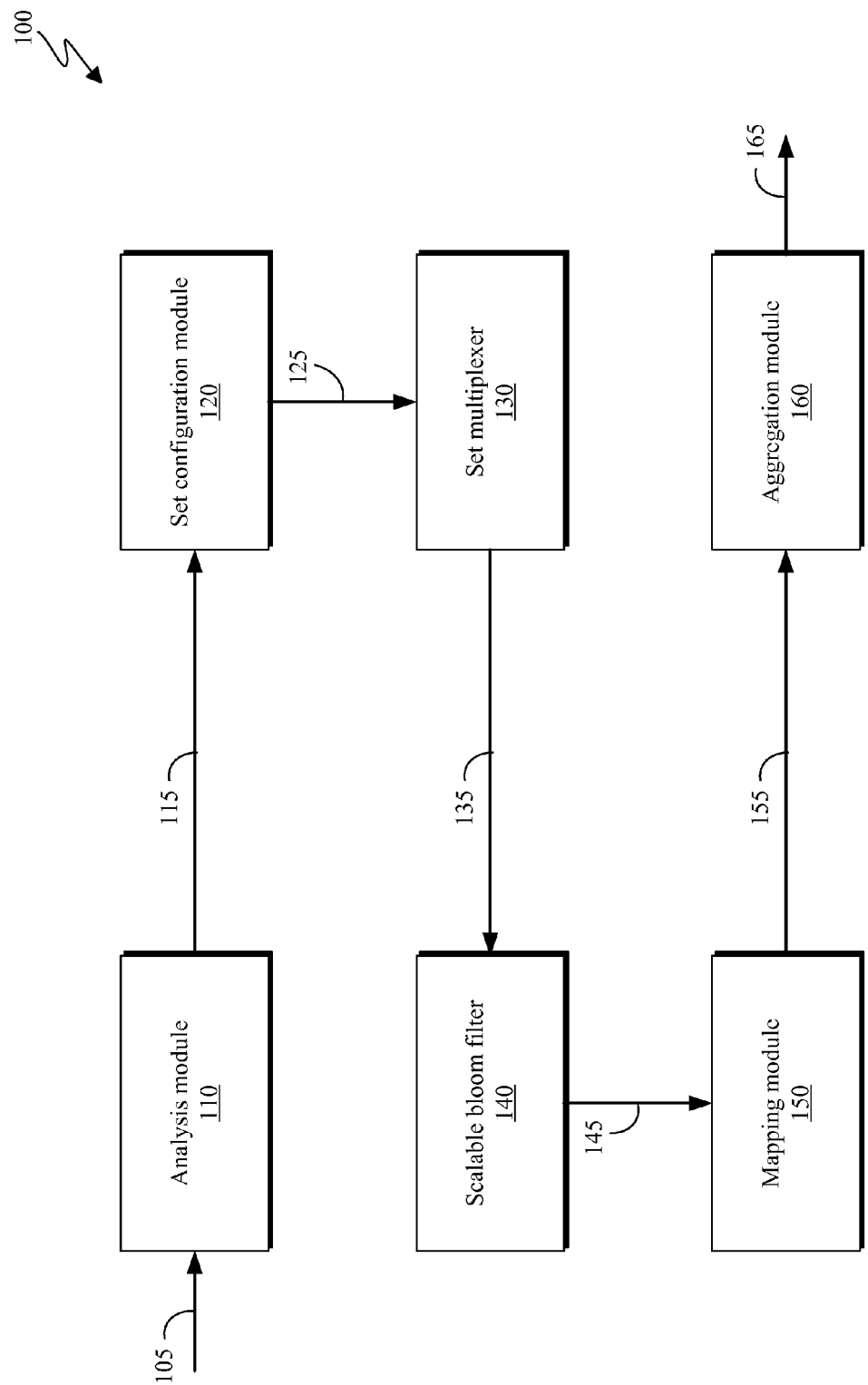
FIG. 1 is a module architecture diagram depicting one embodiment of a multi-domain adaptation system.

FIG. 1 is a module architecture diagram depicting one embodiment of a multi-domain adaptation system 100. As depicted, the multi-domain adaptation system 100 includes a semantic analysis module 110, a set configuration module 120, a set multiplexer 130, a scalable bloom filter 140, a mapping module 150, and an aggregation module 160. The multi-domain adaptation system 100 enables a single bloom filter to be used across multiple domains, which may minimize hardware needs along with area costs and power consumption.

Semantic analysis module 110 may be configured to receive a dataset 105 and conduct multi-domain semantic analysis on the dataset 105. The details of one embodiment of the semantic analysis conducted by semantic analysis module 110 are described in greater detail with respect to operational step 210 of FIG. 2. Semantic analysis module 110 may utilize a parser to conduct the multi-domain semantic analysis. If a multi-domain scenario is detected by semantic analysis module 110, then semantics information 115 corresponding to the dataset 105 is sent to set configuration module 120.

Set configuration module 120 may be configured to receive and process semantics information 115. Processing the semantics information 115 may include using a domain dependent configuration of fractal dimensions to two complementary domain adaptive sets 125. In one embodiment, the two complementary domain adaptive sets correspond to a *Julia* set and a Fatou set in matrix form. The specifics of one embodiment of the processing carried out by the set configuration module 120 are discussed with respect to operational step 220 of FIG. 2.

Set multiplexer 130 may be configured to receive and process complementary domain adaptive sets 125. Processing the complementary domain adaptive sets may include executing existing algorithms to provide a multi-fractal representation of the dataset 135. The specifics of one embodiment of the processing carried out by the set multiplexer 130 are discussed in greater detail with respect to operational step 230 of FIG. 2.

Scalable bloom filter 140 may be configured to receive and process the multi-fractal representation 135. Scalable bloom filter 140 may execute a hash function that is configured to filter out periodic domain patterns from the multi-fractal representations 135 to provide filtered domain adaptive sets 145. The specifics of one embodiment of the processing carried out by the scalable bloom filter 140 are discussed in greater detail with respect to operational step 240 of FIG. 2.

Mapping module 150 may be configured to receive and process the filtered domain adaptive sets 145. Processing the filtered domain adaptive sets 145 may include providing a bijective holomorphic map of the filtered domain adaptive sets to determine the fractal dimensions 155 of the necessary domain adaptive sets. The specifics of one embodiment of the processing carried out by the mapping module 150 are discussed in greater detail with respect to operational step 250 of FIG. 2.

Aggregation module 160 may be configured to receive and process fractal dimensions 155. Processing the fractal dimensions 155 may provide a multi-domain insight aggregator 165 corresponding to the dataset. The specifics of one embodiment of the processing carried out by the aggregation module 160 are discussed in greater detail with respect to operational step 260 of FIG. 2. The multi-domain insight aggregator 165 provides cross-domain insight that may reveal correlations between data fields.

Figure 2:
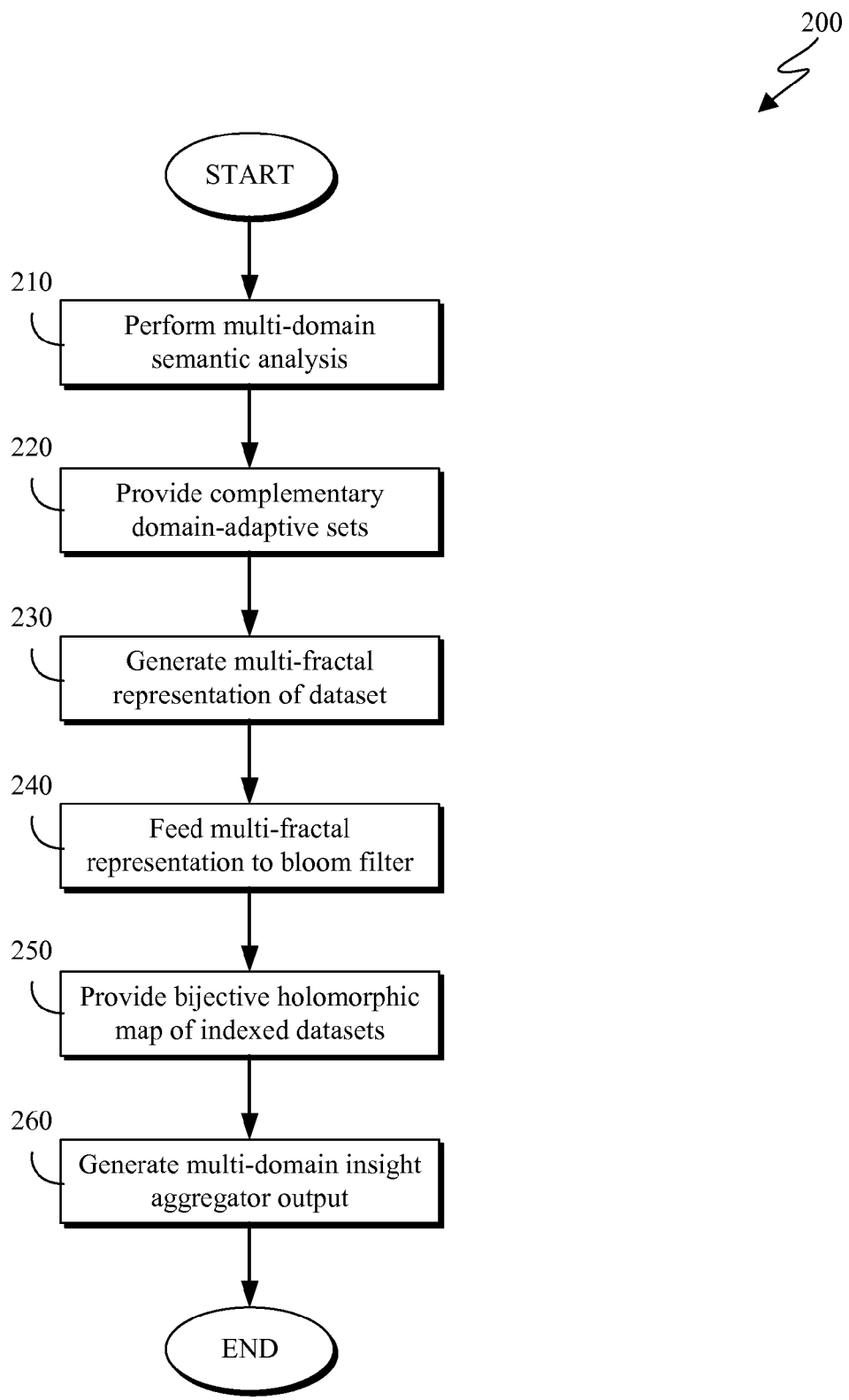
FIG. 2 is a flowchart depicting operational steps of a multi-domain adaptation method in accordance with an embodiment of the present invention.

FIG. 2 depicts operational steps of a multi domain adaptation method 200. As depicted, the multi domain adaptation method 200 includes performing (210) multi-domain semantic analysis, providing (220) complementary domain adaptive sets, generating (230) a multi-fractal representation of the dataset, processing (240) the multi-fractal representation of the dataset with a scalable bloom filter, providing (250) a bijective holomorphic map of the filtered domain adaptive sets, and producing (260) multi-domain insight aggregator output.

Performing (210) multi-domain semantic analysis may include using a parser to detect multi-domain sensitivity of a dataset. The multi-domain semantic analysis may be performed by any number of available standard methods or technologies known to one of skill in the art. Performing (210) multi-domain semantic analysis may additionally include validating, based on the analysis, that a multi-domain scenario is present. If such a scenario is not present, the method terminates (not shown). Otherwise, the method continues by providing (220) complementary domain adaptive sets.

Providing (220) complementary domain adaptive sets may include using a domain dependent configuration of fractal dimensions to make domain adaptive sets. Providing (220) complementary domain adaptive sets may be accomplished via a number of different algorithms. In one embodiment, multi-fractal analysis may be used to configure the sets. According to a multi-fractal formalism developed by Parisi & Frisch, $$Dh=INF_q(q \cdot h-T(q)+c)$$

wherein INF stands for informal convolution, q is the multi-domain dataset, c is a constant representing the levels of iteration, T(q) is a partition function for the multiplicative cascade, and Dh is the fractal dimension. Informal convolution is an operation on two functions (here q·h and T(q)) which produces a third function that is a modified version of one of the original functions. Informal convolution gives the area overlap between the two functions as a function of the amount that one of the original functions is translated. The multi-domain dataset q refers to the dataset of interest as determined by the multi-domain semantic analysis performed in step 210. The constant 'c' representing the levels of iteration is a value that can be optimized based on the desired precision. The fractal dimension dictates the dimensions of the complementary domain adaptive sets that are generated.

Generating (230) a multi-fractal representation of the dataset may include using an algorithm to produce multiplexed domain adaptive sets cascaded with domain input. Generating (230) a multi-fractal representation may include using a program to execute the algorithm to produce the sets. The generated multi-fractal representation may be represented in matrix form as is described with respect to FIG. 3B and FIG. 3C.

Providing (240) the multi-fractal representation of the dataset to a scalable bloom filter may include processing the previously generated multi-fractal representation with a scalable bloom filter to provide filtered domain adaptive sets. The hash function in the scalable bloom filter may be written in such a way that it will filter out the periodic domain patterns from the input. These periodic domain patterns may be false positives to be eliminated. The algorithm executed by the scalable bloom filter may be repeated multiple times until a desired level of precision is reached.

Providing (250) a bijective holomorphic map of the filtered domain adaptive sets may include using the following procedure to determine the dimensions of the required domain adaptive sets.

A multi-fractal structure can be considered as a superposition of homogeneous mono-fractal structures. Consider a set E(h) of Holder exponents 'h' of particles with values in an interval [h, h+Ah]. F(h) is defined as the fractal dimension (FD) of set E(h), which has a mono-fractal structure. Pairs (q, T(q)) and (h,F(h)) are linked by a Legendre transformation:

$$T(q)=q \cdot h(q)-F(h)$$

$$H(q)=b(q)=dT(q)/dq$$

Wherein b is an approximation of Holder coefficient h. Thus for a multi-fractal structure, the dimensions Dq are a decreasing function of q, and h approaches F(h). F(h) is a convex function, the maximum of which will correspond to Hausdroff dimension Dh. This approach can be used to compute Dh and determine the fractal dimensions for the required Julia and Fatou sets. Existing algorithms may be use to carry out the computation.

Producing (260) multi-domain insight aggregator output may include implementing Fourier transformations configured based on a scale corresponding to the levels of iteration (C) mentioned in operation step 220. The Fourier transformations will use the fractal dimensions for the required Julia and Fatou steps as determined in operational step 250 to generate a multi-domain insight aggregator corresponding to the dataset.

Figure 3E:
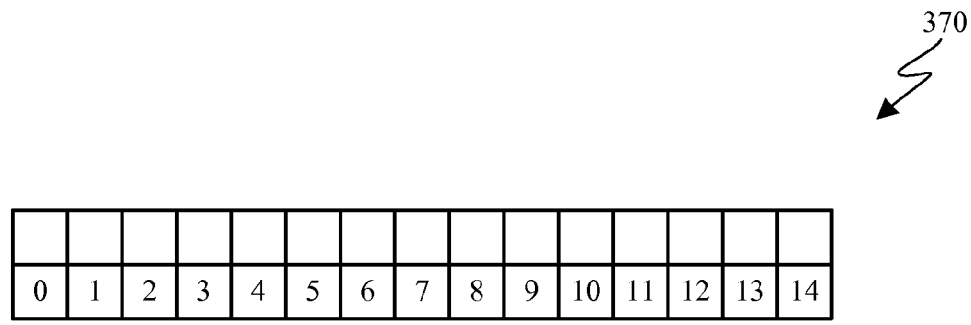
FIG. 3E depicts a base data structure of an empty bloom filter in bit vector form in accordance with one embodiment of the present invention.

FIGS. 3A-3G depict an example of a problem processed using the multi domain adaptation method 200. The results and processing steps depicted in FIGS. 3B-3G correspond to the example problem. FIG. 3A depicts a textual description 305 of the example problem in accordance with one embodiment of the present invention. Textual description 305 is an example of one kind of data which may be provided to a parser for analysis. In this embodiment, the parser used is a domain syntax tree which supports building domain objects. The parser identifies domains present in textual description 305, and aligns other keywords identified with the domains. In this embodiment, the four domains identified are healthcare, transport, telecom, and telemedicine. The keywords identified in this embodiment are as follows with respect to their domains:

Healthcare: 665 heart patients, heart patients, patients, allergic, aspirin, "2015, 665 heart patients", ayurvedic hospital, remote ayurvedic hospital, natural medicines for 1 year, doctors were not sure, doctors, disease, allergic to the medicine.

Transport: travel to north region, reached remote ayurvedic hospital, used various modes of transport, diverse connecting points to metropolitan area, in Chennai.

Telecom: Hospital with very good tele-density, remote sessions with the doctor.

Telemedicine: remote sessions with the doctor.

The parser outputs key-value pairs, with each pair corresponding to an identified keyword and the domain with which it is associated. The key-value pairs in this case are [(Healthcare, 665 heart patients), (Healthcare, patients), . . . , (Telemedicine, remote sessions with the doctor)].

FIG. 3B depicts an example Julia set matrix 310 in accordance with one embodiment of the present invention. As depicted, the Julia set matrix 310 is a matrix representation of a Julia set comprising the key-value pairs provided by the parser. The *Julia* set matrix 310 includes the four domains corresponding to the problem along the diagonal of the matrix (depicted in bold text) and is filled out with random keywords with respect to the matrix diagonal. Multiple matrices in the same format as the depicted Julia set matrix 310 may be produced to represent the entire Julia set.

Similarly, FIG. 3C depicts an example Fatou set matrix 320 in accordance with one embodiment of the present invention. As depicted, the Fatou set matrix 320 is a matrix representation of a Fatou set comprising the key-value pairs provided by the parser. The Fatou set matrix 320 includes the four domains corresponding to the problem along the diagonal of the matrix (depicted in bold text) and is filled out with random keywords with respect to the matrix diagonal. Multiple matrices in the same format as the depicted Fatou set matrix 320 may be produced to represent the entire Fatou set.

FIG. 3D depicts example key-value pair matrices in accordance with one embodiment of the present invention. The key-value pair matrices are generated by indexing each member in the Julia set matrix in 310 in relation to a corresponding member in the Fatou set matrix 320. Indexing in this manner enforces a one to one relationship between the Julia set and the Fatou set. As the matrices depict, the healthcare domain emerges as the major domain in the problem, and the other three domains (telecom, telemedicine, and transport) emerge as minor domains. These key-value pair matrices are fed to a bloom filter to be processed.

Figure 3F:
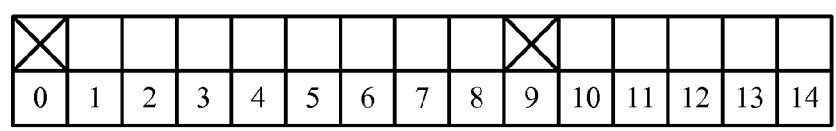
FIG. 3F depicts a base data structure of a bloom filter in bit vector form after one iteration of processing in accordance with one embodiment of the present invention.
Figure 3G:
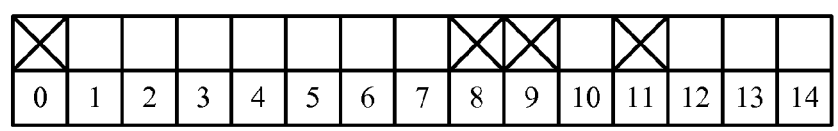
FIG. 3G depicts a base data structure of a bloom filter in bit vector form after two iterations of processing in accordance with one embodiment of the present invention.

FIG. 3E depicts a base structure of a simple bloom filter in bit vector form in accordance with one embodiment of the present invention. The depicted bit vector 370 is initially empty, and is filled out by adding key-value pairs and applying a hash function. FIG. 3F depicts the bloom filter in bit vector form after the addition of the key-value pair [Healthcare, Remote sessions with doctors] and after applying a Fowler-Noll-Vo (FNV) hash function and a murmur hash function. Applying the FNV hash function yields an output of 9, and applying the murmur hash function yields an output of 0, as represented by the X's in the bit vector depicted 380 in FIG. 3F. Similarly, FIG. 3G depicts the same bloom filter after the addition of the key-value pair [Doctors in Chennai, Telemedicine] and after applying a FNV hash function murmur hash function. Applying the FNV hash function yields an output of 8, and applying the murmur hash function yields an output of 11, as represented by the X's in the bit vector 390 depicted in FIG. 3G.

The bloom filter executes set membership queries by executing the same hash function(s) on the string value pair being searched for. If the resulting output values aren't set in the bit vector, then the element is not in the set. If the resulting output values are set in the bit vector, then the element may or may not be in the set. The uncertainty stems from the chance that another key-value pair or some combination of other key-value pairs could have the same bits.

Based on the bloom filter processing, all the false positives from the set can be removed, providing output in the form of a set of optimized key-value pairs for each iteration. For the depicted example, the set of optimized key-value pairs and their corresponding iterations are:

Iteration 1: (Telecom, North), (Telecom, Tele-density), (Telecom, Metropolitan areas)

Iteration 2: (Healthcare, remote Ayurvedic hospital), (Healthcare, Aspirin), (Healthcare, Case history)

Iteration 3: (Telemedicine, Remote sessions with doctors), (Telemedicine, Doctors in Chennai)

Iteration 4: (Transport, diverse connecting points)

The outputted set of optimized key-value pairs for each iteration is then semantically analyzed with respect to the subsequent iterations. The analysis is carried out via bijective holomorphic mapping, which allows the structural similarity between the two sets to be analyzed. Once the holomorphic data is created for each combination of subsequent iterations, the data is aggregated and provided as output depicting the relationship between each of the member sets. This output provides multi-domain insight corresponding to the data extracted from the initial problem as described in text description 305.

Figure 4:
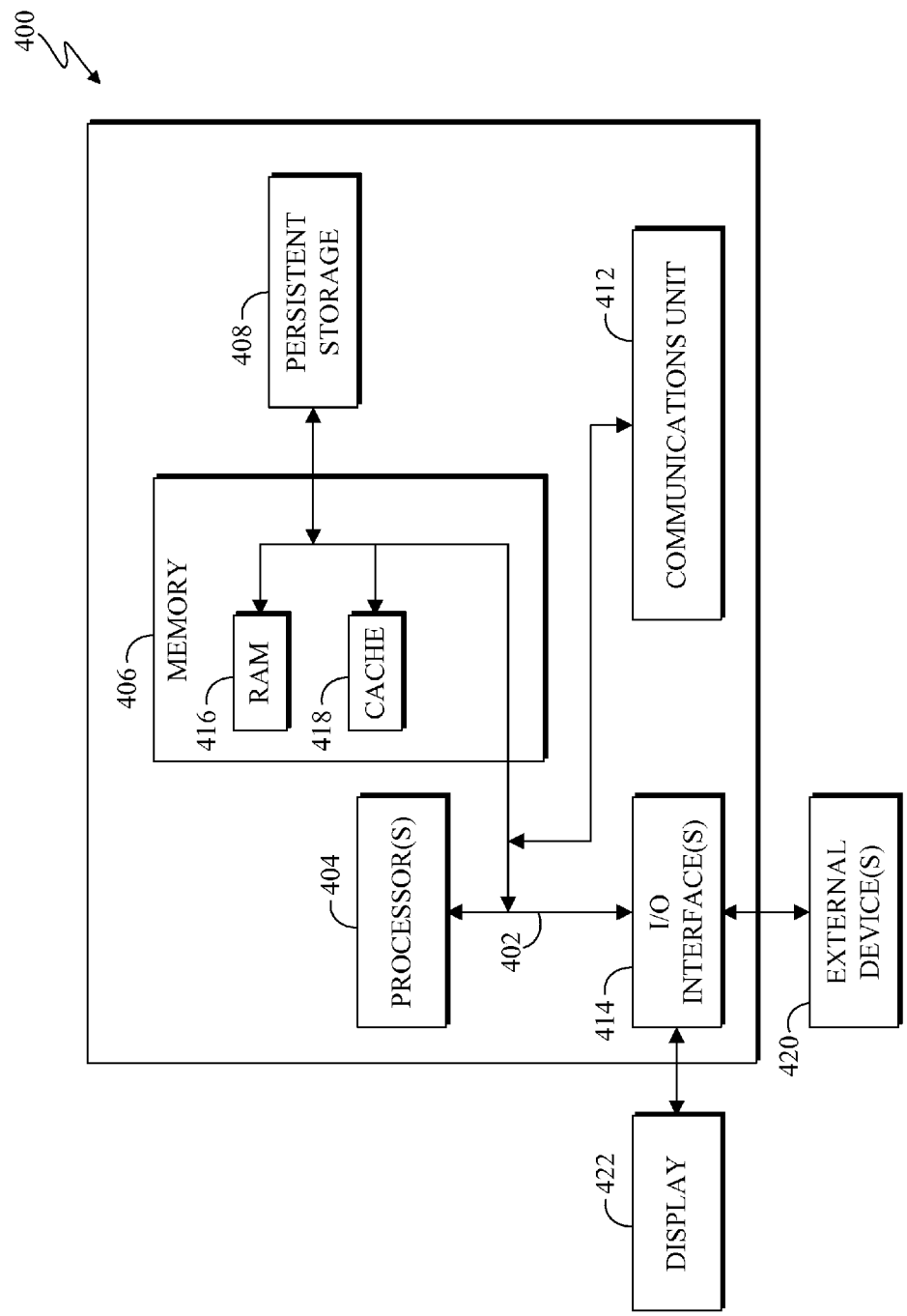
FIG. 4 depicts a block diagram of components of computer 400 in accordance with an illustrative embodiment of the present invention.

FIG. 4 depicts a block diagram of components of computer 400 in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

As depicted, the computer 400 includes communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer-readable storage media. In this embodiment, memory 406 includes random access memory (RAM) 414 and cache memory 416. In general, memory 406 can include any suitable volatile or non-volatile computer-readable storage media.

One or more programs may be stored in persistent storage 408 for access and/or execution by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer-readable storage medium that is also part of persistent storage 408.

Communications unit 410, in these examples, provides for communications with other data processing systems or devices. In these examples, communications unit 410 includes one or more network interface cards. Communications unit 410 may provide communications through the use of either or both physical and wireless communications links.

I/O interface(s) 412 allows for input and output of data with other devices that may be connected to computer 400. For example, I/O interface 412 may provide a connection to external devices 418 such as a keyboard, keypad, a touch screen, and/or some other suitable input device. External devices 418 can also include portable computer-readable storage media such as, for example, thumb drives, portable optical or magnetic disks, and memory cards. Software and data used to practice embodiments of the present invention can be stored on such portable computer-readable storage media and can be loaded onto persistent storage 408 via I/O interface(s) 412. I/O interface(s) 412 also connect to a display 420.

Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer system for minimizing hardware resources necessary to execute multi-domain membership tests by using a single bloom filter, the system comprising:
   one or more computer processors;
   one or more computer-readable storage media;
   program instructions stored on the computer-readable storage media for execution by at least one of the one or more processors, the program instructions comprising instructions to:
   receive a set membership test request comprising one or more data items to search for and a dataset in which to search for the data items;
   perform multi-domain semantic analysis on the dataset to produce semantic information for the dataset, wherein the semantic information includes an indication of two or more domains present with respect to the received dataset;
   process semantic information for the dataset to provide at least two complementary domain adaptive sets corresponding to the dataset;
   process the at least two complementary domain adaptive sets to provide a multi-fractal representation of the dataset;
   apply a single bloom filter to the multi-fractal representation of the dataset to provide at least two filtered domain adaptive sets;
   process the filtered domain adaptive sets to provide a bijective holomorphic map of the at least two filtered domain adaptive sets;
   process the bijective holomorphic map to provide a multi-domain insight aggregator corresponding to the dataset, wherein the multi-domain insight aggregator is a data structure that is processed using a single bloom filter to determine the presence of a data item across two or more domains; and
   determine whether the one or more data items are in the dataset according to the multi-domain insight aggregator.

2. The system of claim 1, wherein the at least two complementary domain adaptive sets include a domain adaptive Julia set which corresponds to a Julia set matrix.

3. The system of claim 2, wherein the at least two complementary domain adaptive sets include a domain adaptive Fatou set which corresponds to a Fatou set matrix.

4. The system of claim 1, wherein the multi-fractal representation of the dataset corresponds to a matrix of key-value pairs, wherein each key-value pair corresponds to a keyword from the dataset and a domain with which the keyword is associated.

5. The system of claim 1, further comprising instructions to use a parser to perform multi-domain semantic analysis on the dataset to provide semantic information for the dataset.

6. The system of claim 1, further comprising instructions to execute a hash function that is configured to filter out periodic domain patterns from the multi-fractal representation of the dataset to provide at least two filtered domain adaptive sets.

7. A method for minimizing hardware resources necessary to execute multi-domain membership tests by using a single bloom filter, the method comprising:
   receiving, by one or more processors, a set membership test request comprising one or more data items to search for and a dataset in which to search for the data items;
   performing, by one or more processors, multi-domain semantic analysis on the dataset to produce semantic information for the dataset, wherein the semantic information includes an indication of two or more domains present with respect to the received dataset;
   processing, by one or more processors, semantic information for the dataset to provide at least two complementary domain adaptive sets corresponding to the dataset;
   processing, by one or more processors, the at least two complementary domain adaptive sets to provide a multi-fractal representation of the dataset;

applying a single bloom filter to the multi-fractal representation of the dataset to provide at least two filtered domain adaptive sets;

processing, by one or more processors, the at least two filtered domain adaptive sets to provide a bijective holomorphic map of the two filtered domain adaptive sets;

processing, by one or more processors, the bijective holomorphic map of the at least two filtered domain adaptive sets to provide a multi-domain insight aggregator corresponding to the dataset, wherein the multi-domain insight aggregator is a data structure that is processed using a single bloom filter to determine the presence of a data item across two or more domains; and determining, by one or more processors, whether the one or more data items are in the dataset according to the multi-domain insight aggregator.

8. The method of claim 7, wherein the at least two complementary domain adaptive sets include a domain adaptive Julia set which corresponds to a Julia set matrix.

9. The method of claim 8, wherein the at least two complementary domain adaptive sets include a domain adaptive Fatou set which corresponds to a Fatou set matrix.

10. The method of claim 7, wherein the multi-fractal representation of the dataset corresponds to a matrix of key-value pairs, wherein each key-value pair corresponds to a keyword from the dataset and a domain with which the keyword is associated.

11. The method of claim 7, wherein performing multi-domain semantic analysis on the dataset further comprises performing, by one or more processors, multi-domain semantic analysis on the dataset to provide semantic information for the dataset.

12. The method of claim 7, wherein processing the multi-fractal representation of the dataset further comprises executing, by one or more processors, a hash function that is configured to filter out periodic domain patterns from the multi-fractal representation of the dataset to provide two filtered domain adaptive sets.

13. The method of claim 7, wherein processing the multi-fractal representation of the dataset comprises removing, by one or more processors, false positive set membership queries from the multi-fractal representation of the dataset to provide at least two filtered domain adaptive sets.

14. A computer program product for minimizing hardware resources necessary to execute multi-domain membership tests by using a single bloom filter, the computer program product comprising:
one or more computer readable storage media and program instructions stored on the one or more computer readable storage media, the program instructions comprising instructions to:
receive a set membership test request comprising one or more data items to search for and a dataset in which to search for the data items;
perform multi-domain semantic analysis on the dataset to produce semantic information for the dataset, wherein the semantic information includes an indication of two or more domains present with respect to the received dataset;
process semantic information for the dataset to provide at least two complementary domain adaptive sets corresponding to the dataset;
process the at least two complementary domain adaptive sets to provide a multi-fractal representation of the dataset;
apply a single bloom filter to the multi-fractal representation of the dataset to provide at least two filtered domain adaptive sets;
process the filtered domain adaptive sets to provide a bijective holomorphic map of the at least two filtered domain adaptive;
process the bijective holomorphic map of the at least two filtered domain adaptive sets to provide a multi-domain insight aggregator corresponding to the dataset, wherein the multi-domain insight aggregator is a data structure that is processed using a single bloom filter to determine the presence of a data item across two or more domains; and
determine whether the one or more data items are in the dataset according to the multi-domain insight aggregator.

15. The computer program product of claim 14, wherein the at least two complementary domain adaptive sets include a domain adaptive Julia set which corresponds to a Julia set matrix.

16. The computer program product of claim 15, wherein the at least two complementary domain adaptive sets include a domain adaptive Fatou set which corresponds to a Fatou set matrix.

17. The computer program product of claim 14, wherein the multi-fractal representation of the dataset corresponds to a matrix of key-value pairs, wherein each key-value pair corresponds to a keyword from the dataset and a domain with which the keyword is associated.

18. The computer program product of claim 14, wherein instructions to perform multi-domain semantic analysis on the dataset further comprise instructions to perform multi-domain semantic analysis on the dataset.

19. The computer program product of claim 14, wherein instructions to process the multi-fractal representation of the dataset further comprise instructions to execute a hash function that is configured to filter out periodic domain patterns from the multi-fractal representation of the dataset to provide at least two filtered domain adaptive sets.

20. The computer program product of claim 14, wherein instructions to process the multi-fractal representation of the dataset comprises instructions to remove false positive set membership queries from the multi-fractal representation of the dataset to provide at least two filtered domain adaptive sets.

* * * * *